United States Patent
Lee

(10) Patent No.: US 11,060,307 B2
(45) Date of Patent: Jul. 13, 2021

(54) DECORATIVE BUILDING MATERIAL MANUFACTURED BY USING SUBLIMATION TRANSFER PRINTING TECHNIQUE AND MANUFACTURING METHOD THEREOF

(71) Applicant: Gye Hyun Lee, Seoul (KR)

(72) Inventor: Gye Hyun Lee, Seoul (KR)

(*) Notice: Subject to any disclaimer, the term of this patent is extended or adjusted under 35 U.S.C. 154(b) by 229 days.

(21) Appl. No.: 16/467,739

(22) PCT Filed: Aug. 28, 2017

(86) PCT No.: PCT/KR2017/009357
§ 371 (c)(1),
(2) Date: Jun. 7, 2019

(87) PCT Pub. No.: WO2018/105856
PCT Pub. Date: Jun. 14, 2018

(65) Prior Publication Data
US 2020/0071940 A1      Mar. 5, 2020

(30) Foreign Application Priority Data
Dec. 9, 2016    (KR) .......................... 10-2016-0167447

(51) Int. Cl.
*C08L 27/06*    (2006.01)
*E04F 15/10*    (2006.01)
(Continued)

(52) U.S. Cl.
CPC ......... *E04F 15/107* (2013.01); *B41M 5/0358* (2013.01); *B41M 5/382* (2013.01);
(Continued)

(58) Field of Classification Search
None
See application file for complete search history.

(56) References Cited

U.S. PATENT DOCUMENTS

| 6,933,043 B1 * | 8/2005 | Son | B32B 27/36 |
|---|---|---|---|
| | | | 428/215 |
| 2020/0071940 A1 * | 3/2020 | Lee | C08L 23/0853 |

FOREIGN PATENT DOCUMENTS

| JP | 2013241000 | 12/2013 |
|---|---|---|
| KR | 20000063296 | 11/2000 |

(Continued)

OTHER PUBLICATIONS

International Search Report—PCT/KR2017/009357 dated Oct. 18, 2017.

*Primary Examiner* — Peter A Salamon
(74) *Attorney, Agent, or Firm* — Cantor Colburn LLP

(57) ABSTRACT

Provided is a decorative building material and a method of manufacturing the same, and more particularly to a decorative building material which is manufactured by a simple process and has a print layer excellent in sharpness, realism, and stereoscopic effect as well as having a functional layer such as an impact absorbing property and a manufacturing method thereof. The method of manufacturing a decorative material includes the steps of: (S1) preparing a transfer film on which a pattern is printed; (S2) preparing a substrate comprising polyvinyl chloride resin, a white film comprising polyvinyl chloride resin, and a transparent film comprising polyvinyl chloride resin; (S3) laminating the white film, the transparent film, and the transfer film on the substrate in order and at the same time performing a heat treatment under pressure; and (S4) peeling off the transfer film.

6 Claims, 2 Drawing Sheets

(51) Int. Cl.
*C08K 3/014* (2018.01)
*C08K 3/013* (2018.01)
*B41M 5/035* (2006.01)
*B41M 5/382* (2006.01)
*C08K 3/22* (2006.01)
*C08K 3/26* (2006.01)
*C08K 3/30* (2006.01)
*C08K 3/36* (2006.01)
*C08L 9/02* (2006.01)
*C08L 9/06* (2006.01)
*C08L 23/08* (2006.01)
*E04F 13/08* (2006.01)
*C08K 3/28* (2006.01)

(52) U.S. Cl.
CPC .............. *C08K 3/013* (2018.01); *C08K 3/014* (2018.01); *C08K 3/22* (2013.01); *C08K 3/26* (2013.01); *C08K 3/30* (2013.01); *C08K 3/36* (2013.01); *C08L 9/02* (2013.01); *C08L 9/06* (2013.01); *C08L 23/0853* (2013.01); *C08L 27/06* (2013.01); *E04F 13/0866* (2013.01); *E04F 13/0871* (2013.01); *C08K 2003/2241* (2013.01); *C08K 2003/287* (2013.01); *C08K 2003/3018* (2013.01)

(56) References Cited

FOREIGN PATENT DOCUMENTS

| | | |
|---|---|---|
| KR | 100380042 | 4/2003 |
| KR | 20060016301 | 2/2006 |
| KR | 100636032 | 10/2006 |
| KR | 20070001130 | 10/2007 |
| KR | 20090066585 | 6/2009 |
| KR | 20110041794 | 4/2011 |

\* cited by examiner

DECORATIVE BUILDING MATERIAL MANUFACTURED BY USING SUBLIMATION TRANSFER PRINTING TECHNIQUE AND MANUFACTURING METHOD THEREOF

TECHNICAL FIELD

The present invention relates to a decorative building material and a method for manufacturing the decorative building material, and more particularly, to a decorative building material having a print layer obtainable through a simple process and being excellent in sharpness, realism, and stereoscopic effect due to use of a sublimation transfer printing technique.

BACKGROUND ART

Polyvinyl chloride floor decorative materials are used in practical living spaces of human beings, so various functionalities and decorative features are required. Recently, as the standard of living has risen and the living environment has improved, demands for various patterns and the luxurious interior design have been increasing.

A commonly used polyvinyl chloride floor decorative material is composed of a balance layer, a base layer, a print layer and a surface layer, and the print layer is generally printed by a gravure printing method to express the appearance. However, since the gravure printing is made in a plane, it is difficult to obtain a product having a stereoscopic effect. In addition, in order to express various colors and images, many gravure printing rolls suitable for each design are required.

Therefore, the gravure printing method had a problem of increasing a manufacturing cost due to the long time required for producing the printing rolls and large manpower required for producing the same, as well as a problem of not capable of rapidly responding to customer's demand due to the long time required for mixing colors for matching a certain color. As a result, there was a limit in printing a specific mosaic design or image such as a unique design and a specific logo.

Further, since the viscosity of the gravure printing ink to be used changes with the lapse of time, the change in color between lots is severe and since a printing using a powdery pigment having a large particle size is difficult, in the case of pearl pigment, printing may be made only at a size of about 50 µm or less but at a size larger than this size, printing may not be partially made due to clogging of the mesh of the gravure printing roll.

Due to such problems, in the gravure printing method, not only a variety of colors could not be displayed but also it was difficult to display a variety of colors and patterns having stereoscopic effect because there was a limitation in printing a unique pattern of a mosaic design.

In order to solve such problems, there have been proposed many related patents that can provide a stereoscopic effect and simultaneously produce various colors and patterns by using a digital printing method.

Korean Patent Application Publication No. 2009-0066585 discloses a method for manufacturing material for floor covering. This method is capable of realizing various mosaic patterns and various colors of material for floor covering. However, the method has difficulty in solving fundamental problems wherein the manufacturing process is complicated due to limitations in processing characteristics of material for floor covering and the durability is lowered due to UV-curable ink with poor durability.

Korean Utility Model Application Publication No. 2007-0001130 discloses a reinforced floor board manufactured in an overlap pattern printing using a UV printer. This method is capable of realizing various mosaic patterns and various colors of material for floor covering but the method also has difficulty in solving fundamental problems wherein the manufacturing process is complicated due to limitations in processing characteristics of material for floor covering, and durability is lowered due to UV-curable ink with poor durability.

In addition, in the case of the conventional polyvinyl chloride floor material, various colors and mosaic patterns with a stereoscopic feeling were displayed by cutting accurately the respective different floor materials into the respective mosaic pieces using a water-jet apparatus according to the pattern of a design, then assembling the mosaic pieces, and processing them into the form of design desired by the consumers.

The above-mentioned mosaic-type floor material needed an accurate construction because, when the mosaic-type floor material was constructed on the floor and elevator, the mosaic pieces had to be fitted again on the spot depending on the pattern and color. Therefore, it was very difficult for even a skilled person to perform this work and it took a lot of time to construct the floor material. In addition, even if a precise construction was carried out, there was a problem wherein gaps between constructed cut surfaces were widened or the constructed cut surfaces were separated from each other depending on the degree of shrinkage and expansion of the floor material and the adhered surface.

In addition, gaps between the cutting surfaces were widened or the cutting surfaces were separated from each other after a long period of time depending on the degree of shrinkage and conditions (for example, moisture, temperature, bending degree, etc.) of the constructed floor materials and the adhered surfaces. When the construction was poorly made or when the design and construction location had to be changed, it was difficult to fix them.

In order to solve such problems, the invention related to a polyvinyl chloride floor material which has a stereoscopic effect and can produce various colors and patterns using a digital printing method has also been disclosed.

As a representative example thereof, Korean Patent Application Publication No. 2006-0023483 has disclosed a method for printing a calligraphy pattern, which could realize various colors and various colors of a mosaic pattern. However, this method had a problem that the print sharpness varied depending on the environmental condition of aging after printing. In addition, the method required many additional facilities such as a separate mixer for the absorbent composition, a coater for coating the absorbent composition, a treatment room for aging prints after a digital printing, and a cleaning room for washing the printed surface. In addition, the method had the problem wherein, since the process was complicated, the productivity and the work efficiency were remarkably lowered, leading to a rise in manufacturing cost and a decrease in the production amount, thereby deteriorating the market competitiveness.

Korean Patent Application Publication No. 2006-0016301 has disclosed a method for producing a mosaic floor material. However, a high-temperature pressurizing process, which was an essential condition for sublimation transfer for realizing a variety of mosaic patterns and various colors, was omitted in this method and thus the method had a problem wherein the durability and sharpness of the printed surface were deteriorated. In addition, there was a limit in completely overcoming the problem wherein a separate facility was required and the manufacturing process was complicated and thus, the productivity and the work efficiency were remarkably lowered, leading to a rise in manufacturing cost and a decrease in production, thereby deteriorating the market competitiveness.

DETAILED DESCRIPTION OF THE INVENTION

Technical Problem

Therefore, a manufacturing technique capable of producing a variety of colors and various mosaic patterns is required, as well as providing rapidly and accurately a specific mosaic design or image such as a unique design, a specific logo while maximizing the sharpness, realism and stereoscopic effect of the printing.

In addition, there is a need for a floor material and a manufacturing method thereof that can satisfy the physical properties required for decorative building material such as surface durability, dimensional stability, flexibility, curling property, and flexural strength of the finished product, that can ensure market competitiveness through increased production and decreased manufacturing cost by improving the productivity and work efficiency by simplifying the manufacturing process, and that can ensure workability.

SUMMARY OF THE INVENTION

The present invention has been made to solve the above-mentioned conventional problems, and the present invention can overcome the limitation of the design by improving a printing method of polyvinyl chloride floor material that expresses the appearance by the conventional gravure printing method, and can ensure the market competitiveness through reduced manufacturing cost according to improved productivity and work efficiency by simplifying the manufacturing process, as well as securing workability.

In addition, the object of the present invention is to provide a method of expressing a specific mosaic design or image, without expressing a specific mosaic design or image by precisely cutting the respective different floor materials having various colors and patterns to the respective mosaic pieces according to the pattern of the design using a water jet device and then assembling the mosaic pieces like the conventional method of producing a mosaic floor material.

Also, the object of the present invention is to provide a manufacturing method capable of producing specific mosaic designs and images such as various shapes, specific logos and unique characters according to customer's demand, and capable of producing various colors and mosaic patterns by optimizing the sharpness, realism and stereoscopic effect of the printing by means of utilization of a hydraulic press that can provide high temperature and high pressure conditions indispensable to sublimation transfer.

Technical Solution

The present invention provides a method for manufacturing a decorative building material comprising the steps of: preparing a transfer film on which a pattern is printed; preparing a substrate comprising polyvinyl chloride resin, a white film comprising polyvinyl chloride resin, and a transparent film comprising polyvinyl chloride resin; laminating the white film, the transparent film, and the transfer film on the substrate in order and at the same time performing a heat treatment under pressure; and peeling off the transfer film.

Preferably, the step of performing the heat treatment under pressure is carried out by hot pressing for 20 to 30 minutes using a pressing machine at 150 to 200° C., followed by cold pressing for 20 to 30 minutes until a temperature of 20 to 30° C. is reached.

Preferably, the method further comprises, after the step of peeling off the transfer film, an aging step of leaving a product obtained after the peeling step for about 5 to 10 minutes in a thermal water bath at 70 to 90° C. and then leaving it for 5 to 10 minutes in a cooling water bath at 20 to 25° C.

Preferably, the step of preparing the transfer film on which the pattern is printed is to print a pattern on a polyethylene terephthalate film or a paper film using a digital printer to produce a transfer film.

Preferably, the decorative building material is a floor decorative material, a wall decorative material, or a ceiling decorative material, and is used as a safe building material with improved stability by adding an impact absorbing elastomer to the substrate to provide an impact absorbing function, thereby improving the walking feeling and increasing the amount of impact absorption.

Preferably, the white film contains 10 to 20 wt % titanium based on the total weight of the white film, and the substrate comprises a base layer and a balance layer, wherein the base layer comprises 100 parts by weight of polyvinyl chloride resin, 10 to 30 parts by weight of elastomer, 1 to 5 parts by weight of heat stabilizer, 20 to 30 parts by weight of plasticizer, 1 to 5 parts by weight of pigment, and 200 to 300 parts by weight of filler. Further, the balance layer comprises 100 parts by weight of polyvinyl chloride resin, 1 to 5 parts by weight of heat stabilizer, 15 to 20 parts by weight of plasticizer, 1 to 5 parts by weight of pigment and 100 to 150 parts by weight of filler, wherein the filler comprises at least one species selected from the group consisting of calcium carbonate, calcium sulfate and silica. Further, the elastomer comprises at least one species selected from the group consisting of nitrile butadiene rubber (NBR), ethylene vinyl acetate (EVA), and styrene butadiene rubber (SBR).

Further, the present invention relates to a decorative building material, comprising: a substrate comprising polyvinyl chloride resin; a white film disposed on the substrate and comprising polyvinyl chloride resin; and a print layer comprising a transparent film that is disposed on the white film and comprises polyvinyl chloride resin and a sublimation transfer ink that is printed on the transparent film, wherein the print layer is manufactured by laminating, on the transparent film, the transfer film on which a pattern is printed, followed by hot pressing and then cold pressing.

Effect of the Invention

In the present invention, a sublimation transfer film is produced using a digital computer and an electrothermal spray printer, and then a print layer is formed by transferring the sublimation transfer film on a polyvinyl chloride film. Thus, unlike the conventional polyvinyl chloride decorative material, a specific mosaic design and image such as a unique and a specific logo can be supplied quickly and accurately, and various colors and mosaic patterns can be produced at the same time. In addition, since the surface layer and the print layer are formed in one structure, it is possible to maximize the sharpness, realism and stereoscopic effect of printing.

In addition, since the manufacturing process is simple, productivity and work efficiency are improved and the manufacturing cost is reduced, thereby providing a decorative material having excellent competitiveness.

In particular, the mosaic pattern can be displayed without using the mosaic pieces by improving the conventional method of manufacturing the mosaic floor material, so that it is possible to easily manufacture various patterns, thereby reducing the manufacturing cost and improving the competitiveness. And the construction is very simple and the construction and maintenance cost is thus low. In addition, it is possible to provide a floor decorative material of capable of not causing defects and of maintaining the pattern as it is at the time of construction after a long use.

In addition, the decorative building material according to the present invention secures the satisfaction of appearance, which is the basic property of the interior design, and is excellent in impact absorbability, so that the walking feeling is improved, the amount of impact absorption is increased, and the stability is also excellent.

DETAILED DESCRIPTION OF THE INVENTION

Figure 1:
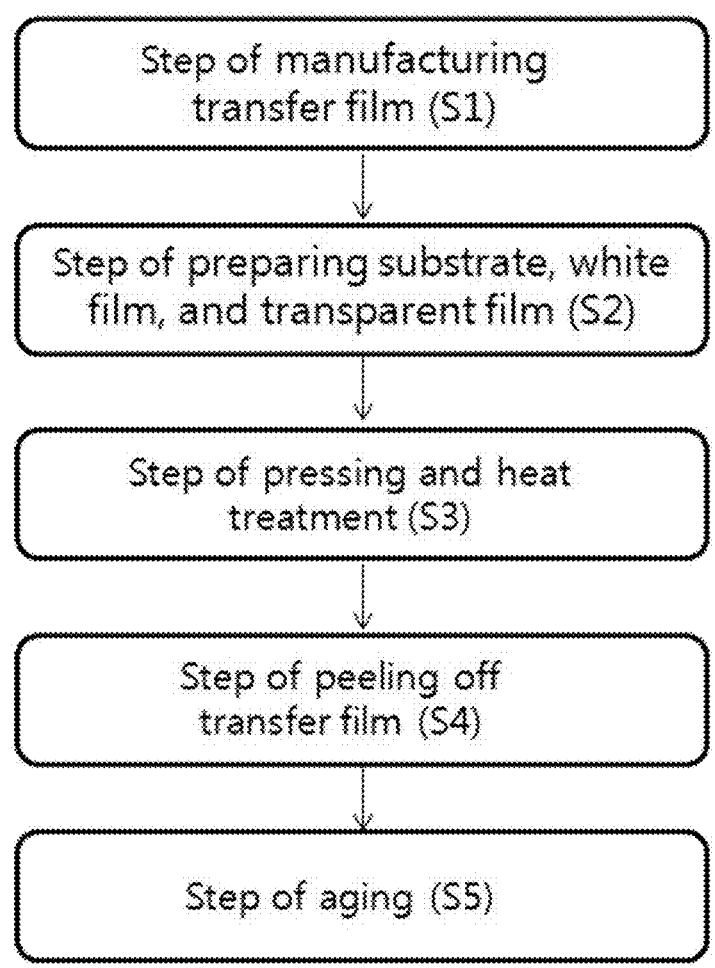
FIG. 1 shows a flow chart of a manufacturing method according to the present invention.

The present invention relates to a method of manufacturing a decorative building material using a sublimation transfer printing technique. More specifically, the decorative building material according to the present invention comprises the steps of: preparing a transfer film on which a pattern is printed (S1); preparing a substrate comprising polyvinyl chloride resin, a white film comprising polyvinyl chloride resin, and a transparent film comprising polyvinyl chloride resin (S2); laminating the white film, the transparent film, and the transfer film on the substrate in order and at the same time performing a heat treatment under pressure (S3); and peeling off the transfer film (S4), and optionally aging a resultant product (S5). FIG. 1 is a flowchart showing a method of manufacturing a decorative building material according to the present invention. Each step will be discussed in detail below.

First, a step (S1) of preparing a transfer film on which a pattern is printed is more specifically a step of printing a pattern on a polyethylene terephthalate film or a paper film using a printing apparatus to produce a transfer film. The printing apparatus means a digital printing machine. Specifically, in the above step, a desired pattern is set using a scan and graphic program in a digital computer, and the set pattern can be printed on a substrate (film) using an electrothermal spray printer and sublimation transfer ink. The sublimation transfer ink may contain all of the inks used in the art.

As used in the present invention, the term "pattern" is a broad concept including letters, numbers, figures and the like, which means any design that can be printed on a decorative material. According to the method used in the present invention, it is possible to set a desired pattern without limitation, and it is easy to produce a customized pattern or a design thereof as well as a logo and a mosaic design.

The transfer film is preferably a polyethylene terephthalate film or a paper film, more preferably a polyethylene terephthalate film, and even more preferably a special heat-resistant polyethylene terephthalate film for transfer. However, the transfer film is not limited thereto. All films excellent in ink-collecting property in this technical field can be used. In particular, unlike other films, the heat-resistant polyethylene terephthalate film for transfer is most suitable because it is excellent in tensile strength and wet friction stability, morphological stability in the pattern area after printing, and ink-collecting property capable of expressing these lines.

The thickness of the transfer film is preferably 12 μm or more, and more preferably 12 to 20 μm. Though the thickness of the transfer film is determined according to the characteristics of the ink used, the thinner the film thickness, the lower the cost of the film. Thus, the cost of the film can be saved. When the thickness of the film is less than 12 μm, it is not preferable because the printing is not well performed, or the heat resistance is low during the sublimation transfer. Further, when the thickness of the film is more than 20 μm, there is little improvement in the effect obtained with respect to the cost.

Next, a step (S2) of preparing a multilayered substrate comprising polyvinyl chloride resin, a white film comprising polyvinyl chloride resin, and a transparent film comprising polyvinyl chloride resin is performed. The substrate, the white film, and the transparent film are all characterized by comprising polyvinyl chloride resin.

The substrate can be changed in material, thickness, etc. according to the location to be used, the application and the other required physical properties, and the substrate can impart functions such as impact absorption, sound absorption, sound insulation, moisture prevention and flame resistance to a decorative building material. The thickness of the substrate can change depending on the thickness of the final decorative building material.

For example, when the decorative material of the present invention is used as a decorative material for floor, it may include a base layer and a balance layer. For example, the base layer may comprise 100 parts by weight of polyvinyl chloride resin, 1 to 5 parts by weight of heat stabilizer, 20 to 30 parts by weight of plasticizer, 10 to 30 parts by weight of elastomer, 1 to 5 parts by weight of pigment and 200 to 300 parts by weight of filler in order to compensate for the thickness of the floor material and to impart functions such as cushioning, walking feeling and impact absorption. In addition, the balance layer may comprise, for example, 100 parts by weight of polyvinyl chloride 1 to 5 parts by weight of heat stabilizer, 15 to 20 parts by weight of plasticizer, 1 to 5 parts by weight of pigment and 100 to 150 parts by weight of filler in order to control and balance the curling phenomenon and the dome phenomenon of the floor material, to prevent deformation due to the floor moisture after the construction, and to improve adhesion with the floor of the building.

The filler may include at least one species selected from the group consisting of calcium carbonate, calcium sulfate and silica. When the amount of the filler used in the base layer is less than 200 parts by weight, the effect of dimensional stability and cost reduction of the floor material may be insignificant. When the amount of the filler used therein is more than 300 parts by weight, the flexibility and bonding force may weaken due to the increase of the density of the floor material. The elastomer may include at least one species selected from the group consisting of Nitrile Butadiene Rubber (NBR), Ethylene Vinyl Acetate (EVA), and Styrene-Butadiene Rubber (SBR). When the amount of the elastomer used is less than 10 parts by weight, the impact absorbing effect is insignificant. When the amount thereof is more than 30 parts by weight, the interlayer bonding force may weaken.

The white film containing polyvinyl chloride resin can be prepared by adding titanium, which is a white pigment, that imparts whiteness and hiding power so as to double the printing effect of a print layer and hide a black lower substrate. The titanium may be contained in an amount of 10 to 20 wt % based on the total weight of the white film. As the content of titanium increases, whiteness and hiding power get better but the problem of fish-eye or of lowering the bonding force between layers occurs. Thus, it is preferable that titanium does not to exceed 20 wt % with respect to the total weight of the white film. In addition, when titanium is contained in an amount of less than 10 wt %, desired whiteness and hiding power cannot be obtained and the printing of the print layer is not clear and sharp. The thickness of the white film may be 0.05 to 0.2 mm, preferably 0.07 to 0.1 mm, but is not limited thereto. The film thicker than the above-mentioned range can be used but as the thickness thereof gets thick, the more content of titanium per $m^2$ is required and the manufacturing cost increases. If the thickness thereof is thinner than the above-mentioned thickness, the production cost can be reduced but the hiding power of the substrate and the sharpness of printing are deteriorated.

The transparent film may comprise polyvinyl chloride resin and may comprise the general substance used in the art to make transparent polyvinyl chloride films. In one embodiment, the transparent film may comprise 100 parts by weight of polyvinyl chloride resin, 1 to 5 parts by weight of heat stabilizer, 30 to 40 parts by weight of plasticizer, and 1 to 3 parts by weight of a processing additive. The thickness of the transparent film is determined in consideration of the consumer's needs, the application of the product and the like, and may be usually 0.05 to 1.0 mm, preferably 0.1 to 0.5 mm. If the transparent film is thicker than the above range, the durability is improved and the realism, stereoscopic effect, and sharpness of printing is improved since the depth of penetration of the sublimation ink during sublimation transfer is deepened. However, since the amount of polyvinyl chloride resin used increases, the manufacturing cost increases. In addition, when the thickness is thinner than the above range, the durability is poor and the realism, stereoscopic effect, and sharpness of printing are bad since the penetration depth of the sublimation ink during sublimation transfer is shallow.

Next, the step (S3) of laminating the white film, the transparent film, and the transfer film on the substrate in order and performing the heat treatment under pressure at the same time is provided. Specifically, in the step of the heat-treating under pressure, hot pressing is performed for 20 to 30 minutes using a pressing machine at 150 to 200° C., followed by cold pressing to 20 to 30° C. for 20 to 30 minutes.

When a transfer film is laminated on top of the transparent film and the transfer film is pressed under a high temperature and pressure condition, a printed sublimation ink is transferred to the transparent film while being sublimated. That is, the transparent film expands due to strong heat, and a space is formed in which the ink can enter into resin molecules of the film, and the ink penetrates into the space to be thermally transferred. When heat is removed by using a cooling and pressing press from the surface of the transparent film into which the transferred ink is impregnated, the expanded film contracts again at the interior thereof and the transfer is completed while the transferred ink is strongly encapsulated. Thereafter, a separate water washing step is not required in the method according to the present invention.

The step of thermally transferring the sublimation ink to the transparent film is an important step that determines the print quality. The product quality depends on the pressure, temperature and time of the press. Thus, when the given conditions are not satisfied, the transfer rate of sublimation dye is poor and thus colors get darkened and the sharpness deteriorates. Therefore, it is important to control these conditions.

The pressing and heat-treating step for thermally transfer the sublimation ink to the transparent film may be performed through a hot-pressing treatment using a press machine at 150 to 200° C., preferably 170 to 180° C. for 20 to 30 minutes. When the temperature is lower than 150° C., it does not reach the melting point of polyvinyl chloride resin at the time of a pressing heat treatment of the semi-finished product obtained by laminating the substrate composed of polyvinyl chloride resin, the white film and the transparent film. There is a problem that the transfer rate of the sublimation ink is lowered and the sharpness of the printing is lowered. On the other hand, when the temperature exceeds 200° C., it is excessively higher than the melting point of polyvinyl chloride resin, so that the laminated semi finished product are deformed or broken. Therefore, there are problems that the properties required for the floor material such as thickness reduction, dimensional deformation and curling are not satisfied and a specific mosaic design or image such as various shapes, specific logos, and unique characters that meet the customer's demand looks deformed.

After the hot pressing treatment, the cold pressing treatment until the room temperature or 20 to 30° C. is reached may be performed for 20 to 30 minutes.

The pressure applied during the hot pressing and the cold pressing may be 50 to 70 $kg/cm^2$, but the present invention is not limited thereto. And it may be varied in consideration of the hardness of the semi-finished product obtained by laminating the substrate, the white film and the transparent film, etc.

Next, step (S4) of peeling off the transfer film is provided.

Further, in order to express a certain emboss shape on a film, an embossing plate of a certain type may be placed on a polyethylene terephthalate sublimation transfer film or a paper sublimation transfer film, and then a hot pressing treatment and a cold pressing treatment may be performed.

Further, the method for manufacturing the decorative building material may further comprise, after the step of peeling the transfer film, the step (S5) of aging, sequentially in a thermal water bath and a cooling water bath, a product obtained after the peeling step. In this step, the aging is to be performed by leaving the product obtained after the peeling step, for 5 to 10 minutes in a thermal water bath of 70 to 90° C., and then for 5 to 10 minutes in a cooling water bath of 20 to 25° C. (room temperature). The temperature of the thermal water bath may be 70° C. or higher, more preferably 80° C. or higher, but preferably 90° C. or lower. The aging step serves to prevent the deformation of the decorative building material and improve the dimensional stability, and through the aging the temperature of the product surface may be kept constant and thus the cutting surface may be kept clean during the cutting. The reason for sequential aging in the thermal water bath and the cooling water bath is to remove all of stresses generated during hot pressing and cold pressing and to ensure that the product has a stable chemical molecular structure. After the stress is removed at a temperature of Tg (glass transition temperature) or higher of the polyvinyl chloride resin, the product may maintain a stable structure at a room temperature state, for example, at a temperature of 20 to 25° C., thus to prevent deformation of the product and to be capable of satisfying properties required for the decorative building material.

A decorative building material manufactured in this way is cut to a standardized size with a knife mold using a hydraulic press and then packed and shipped.

In addition, the present invention relates to a decorative building material manufactured according to the above method.

The thickness of the decorative building material manufactured may vary depending on the customer's needs and the application, but may generally be from 2 mm to 10 mm, preferably from 3 mm to 5 mm.

Figure 2:
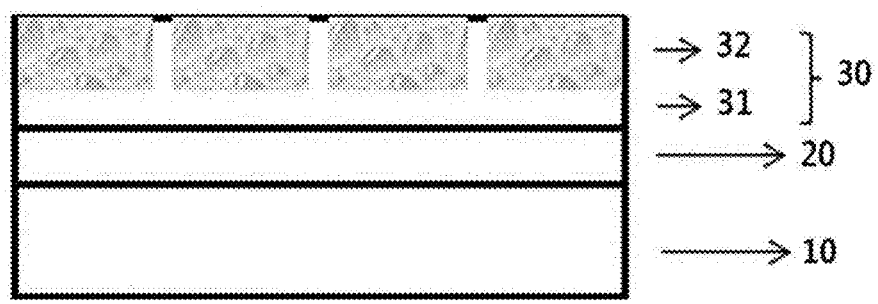
FIG. 2 is a schematic view showing a decorative building material according to the present invention.

FIG. 2 is a schematic view showing a decorative building material according to the present invention. The decorative building material comprises a substrate 10 comprising polyvinyl chloride resin; a white film 20 located on the substrate and comprising polyvinyl chloride resin; and a print layer 30 on which sublimation transfer ink 32 is printed on the transparent film 31, which is disposed on the white film and contains polyvinyl chloride resin.

The decorative building material according to the present invention may be a floor decorative material, a wall decorative material, or a ceiling decorative material. And, the configuration of the substrate may be different depending on the use. In one embodiment, when the decorative building material of the present invention is a wall decorative material, polyvinyl chloride resin foam, polyethylene foam, or polypropylene foam may be used as a substrate or additionally included.

Figure 3:
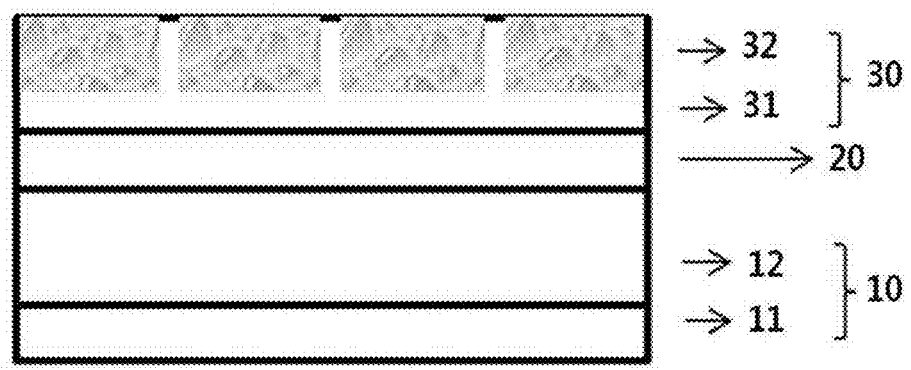
FIG. 3 is a schematic view showing an embodiment of a decorative building material according to the present invention.

FIG. 3 is a schematic view showing an embodiment of a decorative building material according to the present invention, wherein a decorative building material according to the present invention is used as a floor decorative material. In this case, the substrate 10 comprises a base layer 12 and a balance layer 11. The base layer 12 comprises 100 parts by weight of polyvinyl chloride resin, 1 to 5 parts by weight of heat stabilizer, 20 to 30 parts by weight of plasticizer, 10 to 30 parts by weight of elastomer, 1 to 5 parts by weight of pigment and 200 to 300 parts by weight of filler. The balance layer 11 comprises 100 parts by weight of polyvinyl chloride resin, 1 to 5 parts by weight of heat stabilizer, 15 to 20 parts by weight of plasticizer, 1 to 5 parts by weight of pigment and 100 to 150 parts by weight of filler. The filler may comprise at least one species selected from the group consisting of calcium carbonate, calcium sulfate and silica. In addition, the elastomer may comprise at least one species selected from the group consisting of nitrile butadiene rubber (NBR), ethylene vinyl acetate (EVA), and styrene butadiene rubber (SBR). The white film 12 may be polyvinyl chloride resin containing 10 to 20% by weight of titanium based on the total weight of the white film. A print layer 30 having the sublimation ink 32 printed within the transparent film 31 is laminated on the white film layer.

The decorative building material according to the present invention can be manufactured by a simple process while maximizing the sharpness, realism and stereoscopic effect of the print, compared with the decorative building material manufactured by the prior art. In addition, the decorative building material according to the present invention can be used as a safer building material by adjusting the type and amount of the elastomer included in the substrate to provide an impact absorbing function, thereby improving walking feeling and increasing impact absorption to improve stability.

Hereinafter, the present invention will be described in more detail with reference to Examples. It is to be understood by those skilled in the art that these Examples are only illustrative of the present invention in more detail and that the scope of the present invention in accordance with the gist of the present invention is not limited by these Examples.

Preparation of a Decorative Building Material According to Example 1

A transfer film was produced by printing a mosaic pattern on a polyethylene terephthalate film of 19 μm using a printing apparatus (SC-F7100/Epson) and sublimation transfer ink (aqueous sublimation ink of Kiian Corporation, Italy).

A substrate including a base layer and a balance layer was prepared. The base layer was a layer of 18 mm thick manufactured by mixing 100 parts by weight of polyvinyl chloride resin, 4 parts by weight of heat stabilizer, 25 parts by weight of plasticizer, 20 parts by weight of elastomer, 3 parts by weight of pigment and 250 parts by weight of filler. And the balance layer was a layer of 0.6 mm thick prepared by mixing 100 parts by weight of polyvinyl chloride resin, 4 parts by weight of heat stabilizer, 25 parts by weight of plasticizer, 3 parts by weight of pigment and 150 parts by weight of filler. Prepared was a white film of 0.1 mm thick manufactured by mixing 100 parts by weight of polyvinyl chloride resin, 3 parts by weight of heat stabilizer, 15 parts by weight of plasticizer, 10 parts by weight of titanium, and 20 parts by weight of filler. In addition, prepared was a transparent film of 0.5 mm thick manufactured by mixing 100 parts by weight of polyvinyl chloride resin, 4 parts by weight of heat stabilizer and 30 parts by weight of plasticizer.

The balance layer, the base layer, the white film, the transparent film and the transfer film were laminated in this order, and the laminate was hot-pressed at a temperature of 175° C. for 30 minutes at a pressure of 60 kg/cm$^2$ using a press machine and then was cold-pressed at 25° C. at a pressure of 60 kg/cm$^2$. Then, the transfer film was removed, and the resultant laminate was left in a thermal water bath at 90° C. for 5 minutes and then left in a cooling water bath at 25° C. for 5 minutes. A final laminate was cut to a certain size with a knife mold to complete a decorative building material.

Preparation of Decorative Building Material According to Comparative Examples 1 and 2

Decorative building materials according to Comparative Examples 1 (145° C.) and 2 (205° C.) were produced in the same material and method as in Example 1 except that the temperature during hot-pressing was changed to 145° C. and 205° C.

Experimental Example 1: Comparison of Decorative Building Material According to Pressing and Temperature Ranges The appearance state, thickness, sublimation property, dimensional stability and residual indentation ratio of decorative building materials manufactured at different pressing pressures and temperatures were compared. The above properties were evaluated on the basis of KS M 3802 (PVC (vinyl) based floor material) test standard. The results were shown in Table 1.

TABLE 1

| | Appearance condition | Thickness | Print sharpness | Sublimability (Transfer rate) | Dimensional stability | Residual indentation rate (45° C.) |
|---|---|---|---|---|---|---|
| Example1 | good | good | good | 95% or more | 0.03% shrinkage | 2.1% |
| Comparative Example 1 | Bubble generation, Interlayer peeling | Increase | A little reduction | 70% or less | 0.03% shrinkage | 2.3% |
| Comparative Examples 2 | deformed on dimension | Decrease | deformed on print | 95% or more | 0.15% shrinkage | 2.8% |

It can be seen from Table 1 that the floor decorative material (Example 1) produced in accordance with the present invention exhibits superior effects in all properties such as appearance condition, thickness, print sharpness, sublimability, dimensional stability, and residual indentation rate.

As described above, the floor material and the manufacturing method thereof, using the sublimation transfer printing technique of the present invention have been described as specific examples but the present invention is not limited thereto. The new configurations through the combination of and the substitution for the disclosed elements may be employed, but are not beyond the scope of the present invention. In addition, it is obvious that changes and modifications can be easily made on the basis of this specification and such changes or modifications fall within the scope of the present invention.

REFERENCE SIGNS LIST

10: Substrate
11: Balance layer
12: Base layer
20: White film
30: Print layer
31: Transparent film
32: Sublimation transfer ink

What is claimed is:

1. A method of manufacturing a decorative building material comprising the steps of:
   preparing a transfer film on which a pattern is printed;
   preparing a substrate comprising polyvinyl chloride resin, a white film comprising polyvinyl chloride resin, and a transparent film comprising polyvinyl chloride resin;
   laminating the white film, the transparent film, and the transfer film on the substrate in order and at the same time performing a heat treatment under pressure; and
   peeling off the transfer film;
   wherein the white film contains 10 to 20 wt % titanium based on the total weight of the white film;
   wherein the substrate comprises a base layer and a balance layer, wherein the base layer comprises 100 parts by weight of polyvinyl chloride resin, 1 to 5 parts by weight of heat stabilizer, 20 to 30 parts by weight of plasticizer, 10 to 30 parts by weight of elastomer, 1 to 5 parts by weight of pigment and 200 to 300 parts by weight of filler, and the balance layer comprises 100 parts by weight of polyvinyl chloride resin, 1 to 5 parts by weight of heat stabilizer, 15 to 20 parts by weight of plasticizer, 1 to 5 parts by weight of pigment and 100 to 150 parts by weight of filler; and
   wherein the filler comprises at least one selected from the group consisting of calcium carbonate, calcium sulfate and silica; and the elastomer comprises at least one selected from the group consisting of nitrile butadiene rubber (NBR), ethylene vinyl acetate (EVA), and styrene butadiene rubber (SBR).

2. The method according to claim 1, wherein the step of performing the heat treatment under pressure is carried out by hot pressing for 20 to 30 minutes using a pressing machine at 150 to 200° C., followed by cold pressing for 20 to 30 minutes until the temperature of 20 to 30° C. is reached.

3. The method according to claim 1, further comprising an aging step of, after the step of peeling off the transfer film, leaving a product obtained after the peeling step in a thermal bath at 70 to 90° C. for 5 to 10 minutes and then leaving it in a cooling water bath at 20 to 25° C. for 5 to 10 minutes.

4. The method according to claim 1, wherein the step of preparing the transfer film on which the pattern is printed comprises producing the transfer film by printing a pattern on a polyethylene terephthalate film or a paper film using a digital printing machine.

5. The method according to claim 1, wherein the decorative building material is a floor decorative material, a wall decorative material or a ceiling decorative material, and is used as a safe building material that improves a walking feeling and increases an impact absorption by imparting an impact absorbing function.

6. A decorative building material comprising:
   a substrate comprising polyvinyl chloride resin; a white film disposed on the substrate and comprising polyvinyl chloride resin; and a print layer having sublimation transfer ink printed on a transparent film, which is disposed on the white film and contains polyvinyl chloride resin,
   wherein the white film contains 10 to 20% by weight of titanium based on the total weight of the white film,
   wherein the substrate comprises a base layer and a balance layer, wherein the base layer comprises 100 parts by weight of polyvinyl chloride resin, 1 to 5 parts by weight of heat stabilizer, 20 to 30 parts by weight of plasticizer, 10 to 30 parts by weight of elastomer, 1 to 5 parts by weight of pigment and 200 to 300 parts by weight of filler, wherein the balance layer comprises 100 parts by weight of polyvinyl chloride resin, 1 to 5 parts by weight of heat stabilizer, 15 to 20 parts by weight of plasticizer, 1 to 5 parts by weight of pigment and 100 to 150 parts by weight of filler; and
   wherein the filler comprises at least one selected from the group consisting of calcium carbonate, calcium sulfate and silica; and the elastomer comprises at least one selected from the group consisting of nitrile butadiene rubber (NBR), ethylene vinyl acetate (EVA), and styrene butadiene rubber (SBR), and
   wherein the print layer is manufactured by laminating a transfer film having a pattern printed on the transparent film, and hot pressing, followed by cold pressing.

* * * * *